Sept. 27, 1949. C. E. BURNS 2,483,035
CARD RECORD SYSTEM
Filed Dec. 9, 1944 7 Sheets-Sheet 1
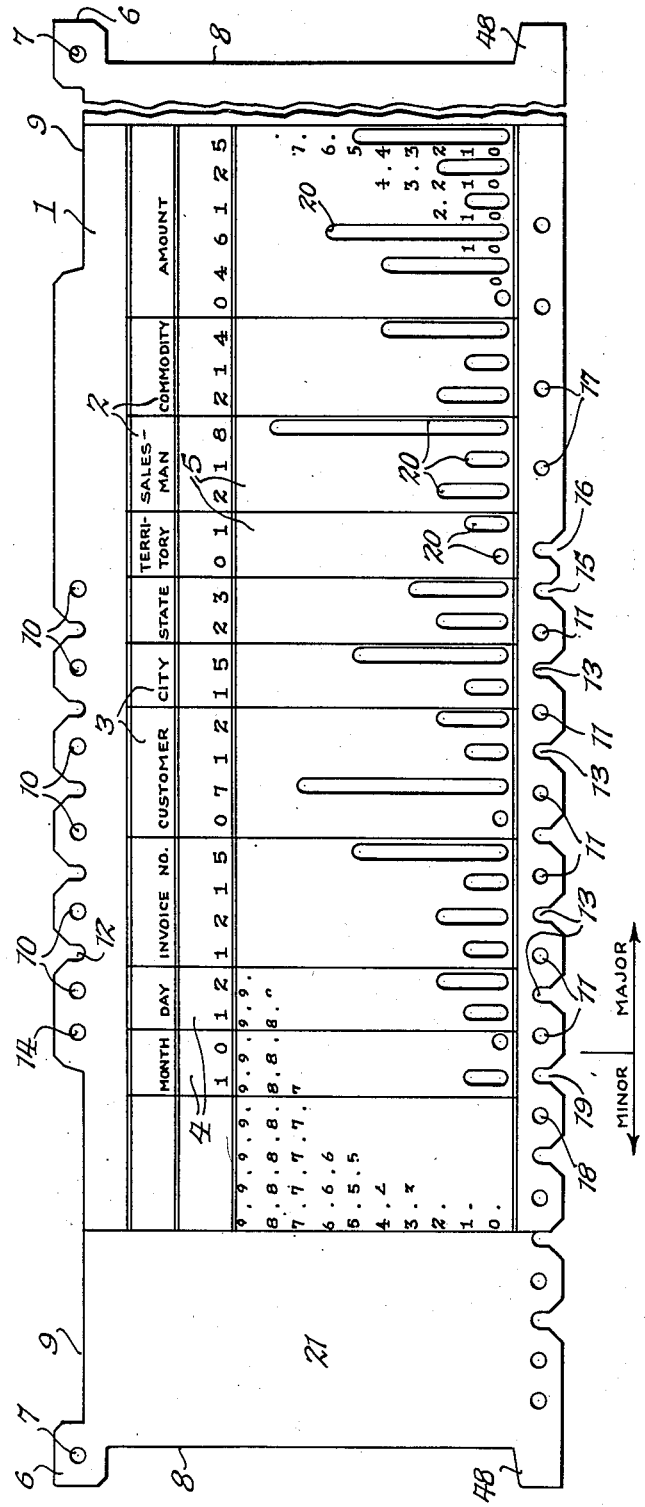
INVENTOR.
Cloyd E. Burns
BY
Parker Prochnow & Farmer
Attorneys Sept. 27, 1949.　　　　C. E. BURNS　　　　2,483,035
CARD RECORD SYSTEM
Filed Dec. 9, 1944　　　　　　　　　　7 Sheets-Sheet 2
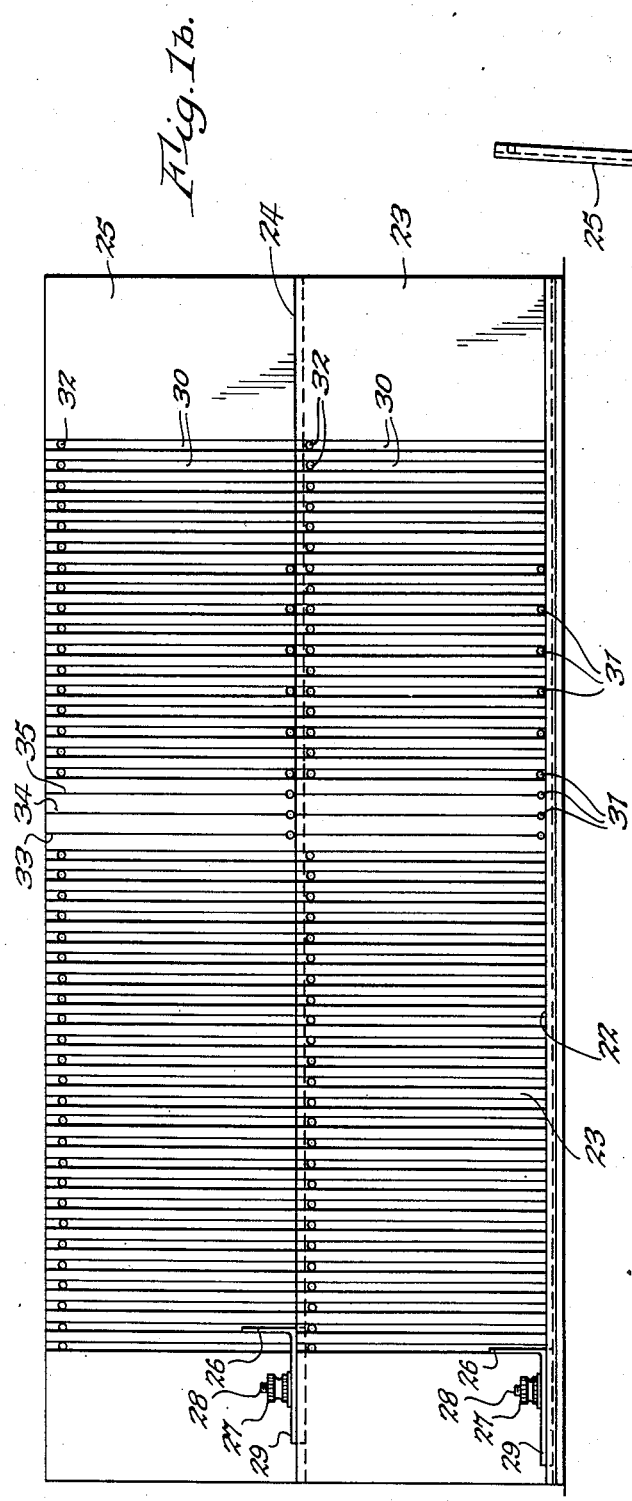
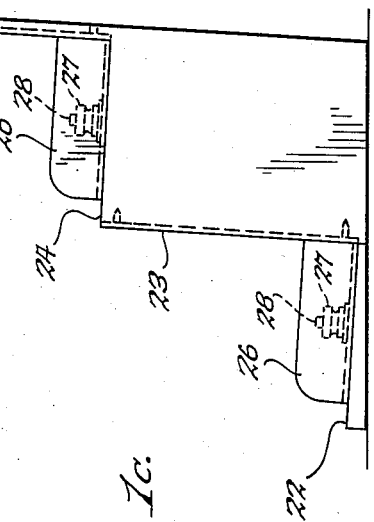
INVENTOR.
Cloyd E. Burns
BY
Parker Prochnow & Garner
Attorneys.

Sept. 27, 1949.     C. E. BURNS     2,483,035
CARD RECORD SYSTEM
Filed Dec. 9, 1944     7 Sheets-Sheet 3
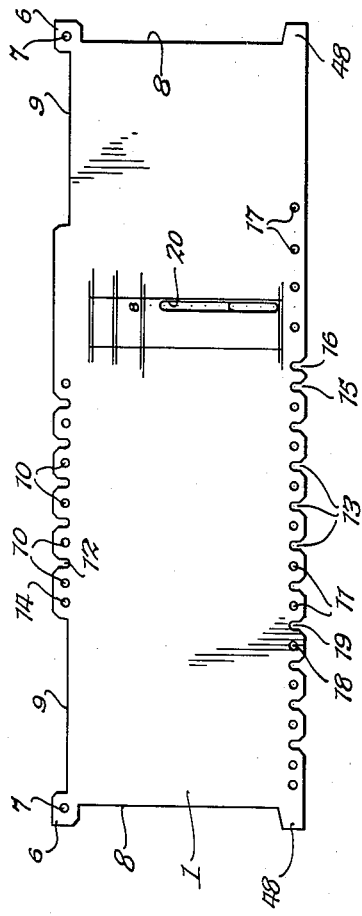
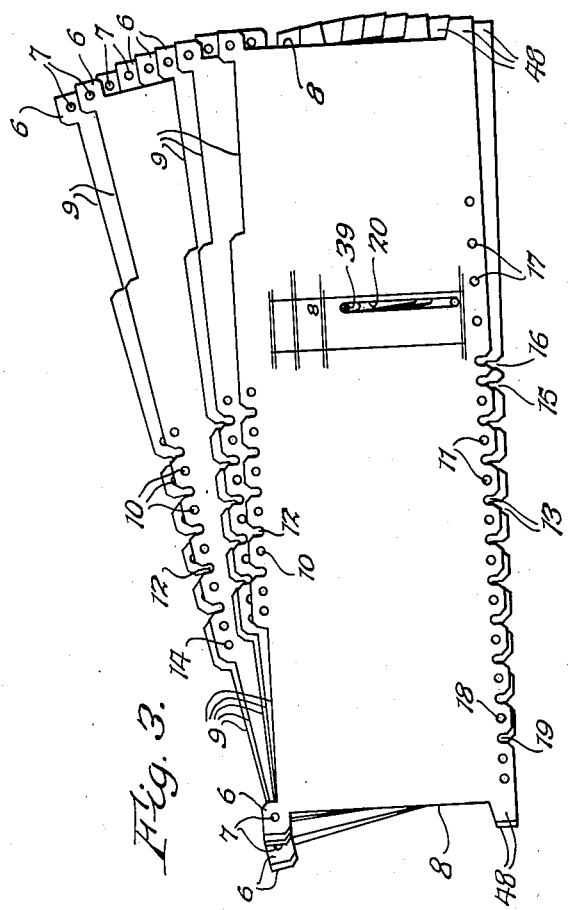
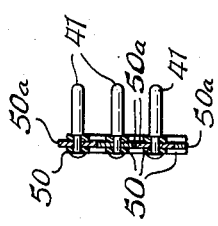
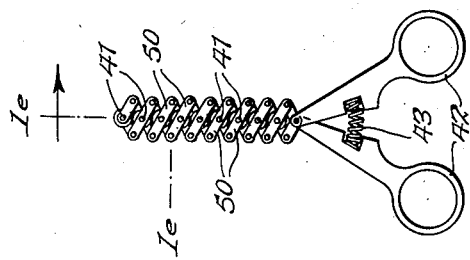
INVENTOR.
Cloyd E. Burns
BY
Parker Prochnow & Thorne
Attorneys.

Sept. 27, 1949.　　　　C. E. BURNS　　　　2,483,035
CARD RECORD SYSTEM

Filed Dec. 9, 1944　　　　　　　　　　　　　7 Sheets-Sheet 4

INVENTOR.
Cloyd E. Burns
BY
Parker, Prochnow & Farmer
Attorneys.

Sept. 27, 1949.
C. E. BURNS
2,483,035
CARD RECORD SYSTEM
Filed Dec. 9, 1944
7 Sheets-Sheet 5
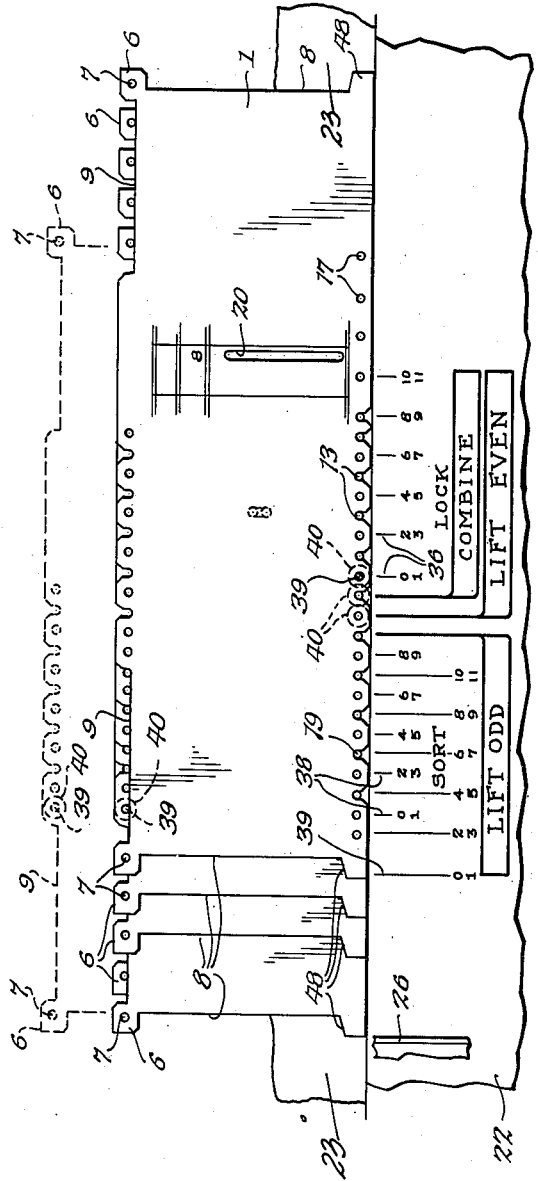
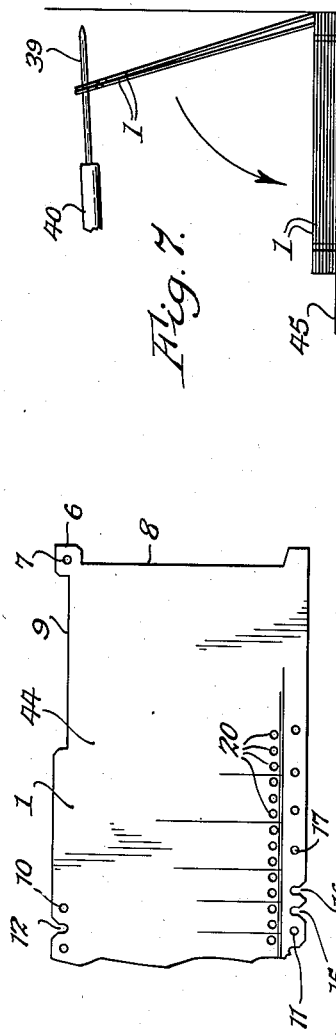
INVENTOR.
Cloyd E. Burns
BY Parker Prochnow & Garner
Attorneys.

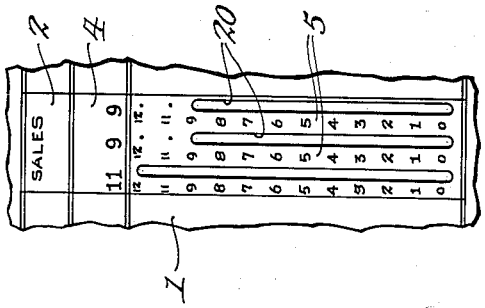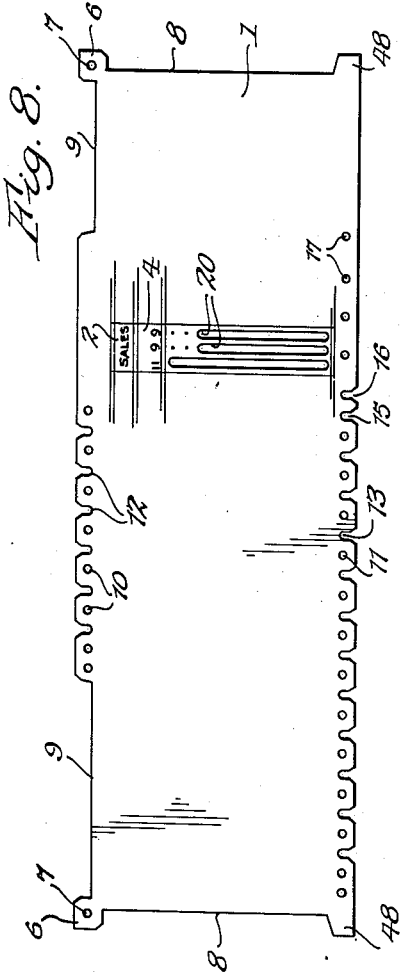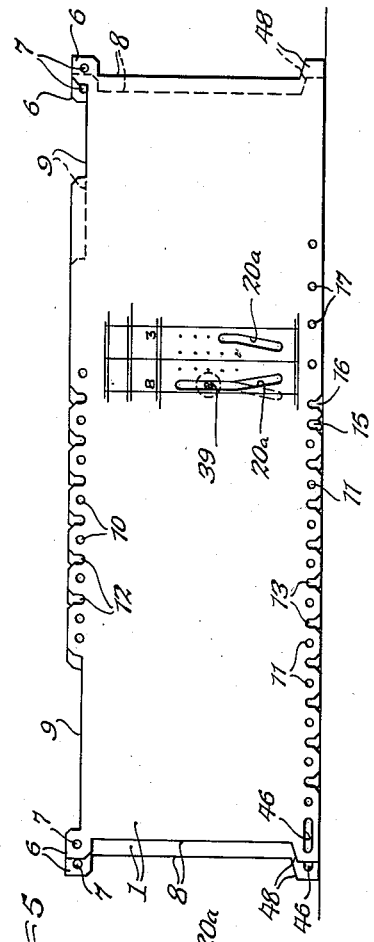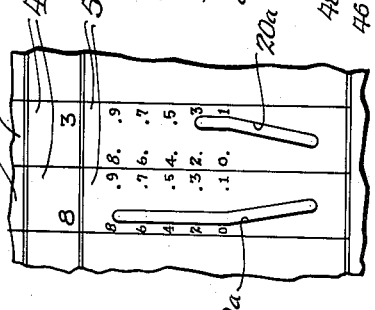

Sept. 27, 1949.    C. E. BURNS    2,483,035
CARD RECORD SYSTEM
Filed Dec. 9, 1944    7 Sheets-Sheet 7
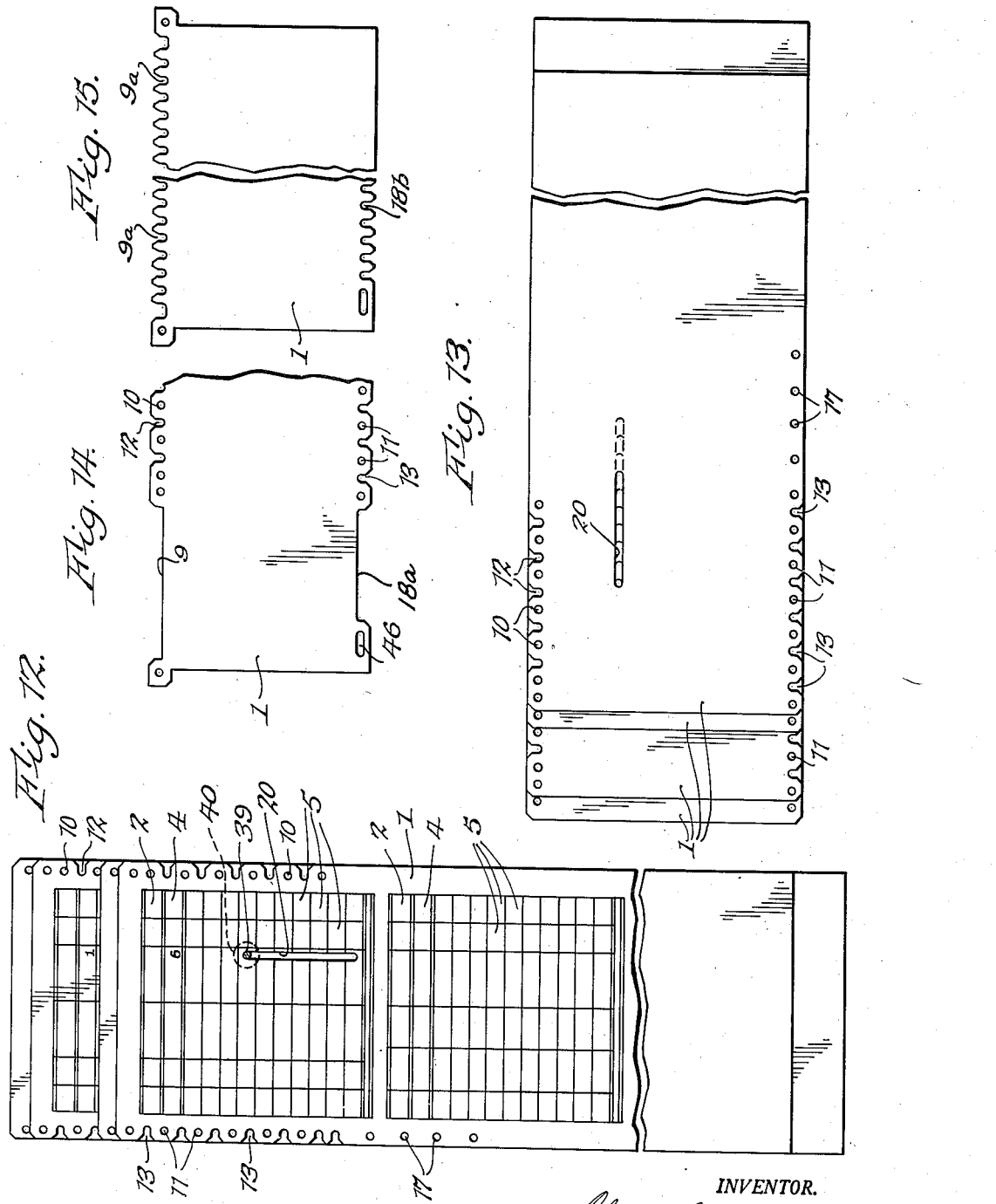
INVENTOR.
Cloyd E. Burns
BY
Parker Prochnow & Farmer
Attorneys.

Patented Sept. 27, 1949

2,483,035

UNITED STATES PATENT OFFICE 2,483,035

CARD RECORD SYSTEM

Cloyd E. Burns, Stamford, Conn.

Application December 9, 1944, Serial No. 567,477

16 Claims. (Cl. 129—16.1)

1

This invention relates to systems and apparatus by which record cards or sheets may have information selectively introduced therein by selected punching or cutting of apertures, and the cards later sorted or segregated according to the information so incorporated in said cards.

In modern business, many records must be kept, and it frequently happens that one desires to ascertain statistical data from such records. Various attempts have been made to make this recorded data easily segregatable. For this purpose record card systems have been devised in which individual cards are provided with a plurality of columns of index point positions in which pertinent information data can be recorded by punching holes in the individual columns, and by which the character of the holes makes it possible to segregate certain of the cards, according to such recorded data, from the other cards.

One object of the invention is to provide an improved record card system, by which the cards may be classified and sorted, in order to collect statistical data, with simple and inexpensive apparatus which will enable rapid classification and groupings of the cards according to the different recorded data thereon, and which will be relatively simple and inexpensive.

Another object of the invention is to provide an improved card system of this type, with which a minimum weakening of the cards will result from incorporation of the data in the cards, with which the cards may be sorted or segregated in groups without resort to expensive or complicated segregating or tabulating machines, with which greater flexibility in the segregation or tabulation of the cards and data carried thereon is possible, with which cards carrying particular data can be easily and rapidly arranged in a desired order, or segregated from other cards, with a minimum number of operations.

Another object of the invention is to provide an improved apparatus for use with record cards, in sorting, grouping, and segregating the cards in various ways, which will be relatively simple, convenient, compact and inexpensive.

Another object of the invention is to provide an improved and simple card record system with which statistical information may be entered in the cards individually, and the cards easily, rapidly and selectively grouped, in a simple manner, in accordance with any of such recorded data or information.

Other objects and advantages will be apparent from the following description of several embodiments of the invention, and the novel features will be particularly pointed out hereinafter in connection with the appended claims.

In the accompanying drawings:

Fig. 1 is a front elevation of one example of a record card constructed in accordance with this invention, and having statistical data recorded thereon ready for filing and sorting;

Fig. 1a is a perspective of one of two or more needles that may be used in sorting the cards according to the data thereon;

Fig. 1b is a face elevation of a support for the cards while sorting and classifying them;

Fig. 1c is an end elevation of the same;

Fig. 1d is a plan of one example of a comb which also is used in the sorting and classification of the cards;

Fig. 1e is a sectional elevation of a portion of the same, the section being taken approximately along the line 1e—1e of Fig. 1d.

Figures 4, 5:
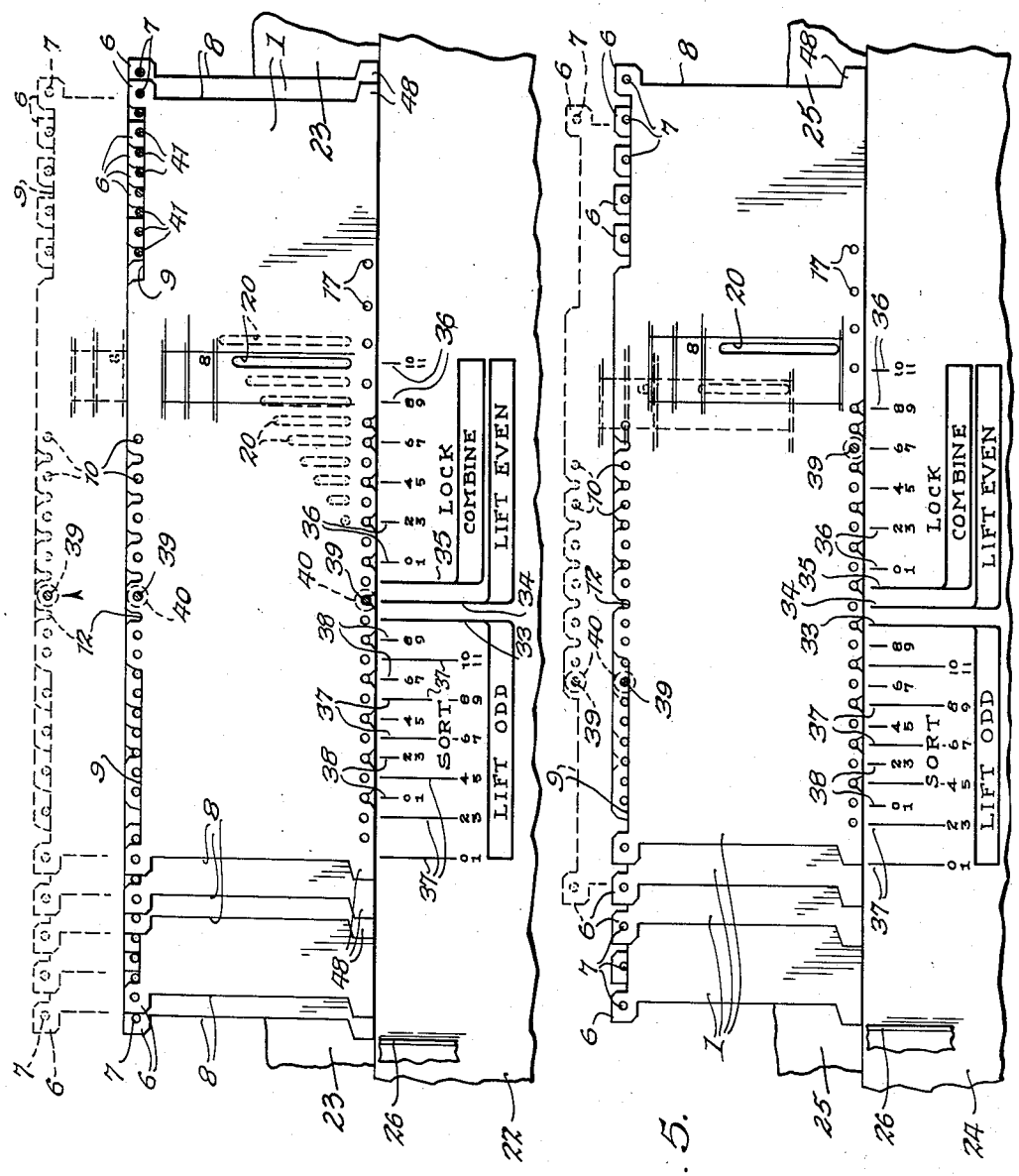

Fig. 2 is a front elevation of a group of cards in which information has been recorded, ready for the preliminary step in sorting and classifying them according to such recorded information, but in this and succeeding views, the recorded information is only shown as entered in one column which is involved in the explanation of a sorting operation, but it will be understood that each of the cards has a plurality of columns as shown in Fig. 1, in which different data may be recorded relating to other subjects of classification;

Fig. 3 is a view similar to Fig. 2, but with the cards in a fanned or stepped relation, and which represents another step in the operation of sorting the cards;

Fig. 4 is a developed view of a group of the cards mounted on the lower deck of a support, and illustrating a subsequent step in the sorting operation;

Fig. 5 is a view similar to Fig. 4 but illustrating some of the cards on the upper deck and representing another step in the sorting operation;

Fig. 6 is a view similar to Fig. 5, but illustrating still another step in the sorting operation;

Fig. 6a is a face view of a portion of a pilot card that may be advantageously used in the sorting operation on any group of cards;

Fig. 7 is an end elevation of a plurality of cards in the dihedral angle of a support, and illustrating a step in the arrangement of the cards in a particular sequence;

Fig. 8 is a view similar to Fig. 1, but illustrating columns of greater lengths, where a greater capacity for data is desired;

Fig. 9 is an elevation on a larger scale of one of the columns of Fig. 8, in order to show more effectively the nature of this card;

Fig. 10 is an illustration of a group of cards similar to Fig. 1, but in which the cards can be sorted as to odd and even numbers in the columns, by the mere action of lifting them into fanned or stepped positions, thus eliminating a step in the sorting operation;

Fig. 11 is a view on a larger scale of the columns illustrated in Fig. 10, to show more effectively the manner in which the openings are cut or punched in the card in order to obtain a preliminary sorting according to odd or even numbers in the columns;

Fig. 12 is a face elevation of a group of cards similar to Fig. 1, but with the columns running lengthwise of the cards instead of cross-wise, and with the cards in the stepped relation obtained in one of the early sorting operations;

Fig. 13 is a view similar to Fig. 12, but illustrating the cards in a numerical sequence according to the information recorded in a particular column;

Fig. 14 is a face elevation of a modification of the card shown in Fig. 1; and

Fig. 15 is a face elevation of a portion of another card, showing further minor modifications.

Referring first to the embodiment of the invention illustrated in Fig. 1, the record card or sheet 1 is of suitable sheet material, such as heavy paper or light cardboard, having in its interior area, a plurality of columns 2 which extend in directions vertically of the card or normal to the longer edges. These cards at the heads of the columns carry printed information as to the character of the entries to be made in the different columns, such as the date, invoice number, customers number, the territory, the salesman, a rate, or any other information that one might desire to record on the card and later serve as the basis for classification of the cards. Immediately below the headings 3 are spaces 4 in which may be entered by pen and ink, or by typewriting or printing, indicia or numbers representing the item which is recorded on the columns concurrently or by an associated operation. Below the spaces 4 are individual item columns 5, sub-divided into positions or spaces. These columns 5 terminate in spaced relation to the lower edge of the card, and the spaces or positions in each column may be identified by numerals 0 to 9 in this example, with the 0 position at the lower end of each column.

Each card has, in at least one of its corners, and preferably in two of said corners if the columns occupy more than half of the length of the card, a tongue 6 having an opening or aperture 7 therein which is spaced from both of the intersecting edges of that corner. These tongues 6 may extend beyond the intersecting edges of that corner, but more conveniently the tongues are formed by providing notches 8 and 9 in the intersecting edges. These notches 8 and 9 run from the adjacent tongue along the related edge for a distance greater than the maximum length of the row of teeth in any comb used in the fanning operation, and they have depths such that the bottom edge of the notch will, if extended, be tangent to the opening 7 at the side thereof furthest from the edge in which the notch is formed. These notches should have at least this minimum depth, and the depth can be greater although no particular advantage is gained by having them of greater depth. In the example shown in Fig. 1, these notches 8 and 9 are formed in both upper corners of the cards, so that there will be a tongue 6 with an opening or aperture 7 therein at each upper corner of each card.

Along the upper edge of each card is a group of apertures 10 arranged in a row parallel to the upper edge of the card and uniformly spaced from each other in the row. Along the lower marginal edge portion of the card are apertures 11 forming a group which are similarly arranged in a row parallel to the lower edge of the card but spaced therefrom and spaced from each other in the row the same distance as that between the apertures 10 along the upper edge of the card. The number of apertures 10 and 11 in each group is not less than ½ of the maximum number of spaces or positions vertically in each of the columns. The apertures of the group 10 preferably, but not necessarily, are midway between and staggered horizontally with respect to the apertures 11, considered in a direction between the upper and lower edges of the card. A notch 12 is disposed midway between each pair of apertures 10 along the upper edge, and a similar notch 13 is disposed midway between each pair of the apertures 11 along the lower edge. With this arrangement, there will be a notch 12 or 13 alined vertically with an aperture 10 or 11 in the opposite edge of the card.

At the left-hand end of the group of apertures 10 is an extra aperture 14 alined in the row with the apertures 10, and spaced from the end aperture 10 in that row by a distance equal to the distance between an aperture 10 and the adjacent notch 12. In the lower marginal edge of each card at the right-hand end of the group of apertures 11 are two notches 15 and 16 which are spaced from the end aperture 11 of the group along the lower edge, a distance equal to the distance between each aperture 11 and adjacent notch 13 and the same distance from each other. At the right of the two notches 15 and 16 along the lower edge of the card, are additional apertures 17 equal in number to not less than ½ the number of vertical spaces in each column minus 1. These apertures 17 are alined horizontally with the row of apertures 11, and they are spaced from the notch 16 and from each other a distance equal to the distance between adjacent apertures 11.

The group of apertures 11 and notches 13 may be called a major group and they are indicated by an arrow and the word "Major" in Fig. 1. At the left of the major apertures 11 are additional apertures 18 and notches 19 alined with, and spaced similarly to the apertures 11 and notches 13, and these apertures and notches may be called a minor group in that they are not used for sorting of the cards. This minor group may be replaced by a single long notch 18a in the lower edge, as shown in Fig. 14, or by a plurality of notches 18b as shown in Fig. 15. The apertures 10, 11, and 14 may be called sorting apertures and the notches 12, 13, 15, and 16 may be called sorting notches.

Information or data is recorded on each card by writing or printing the same in the space 4 for the proper topic, and also by cutting or punching a hole or aperture 20 in each column for a length which indicates by the number of positions it covers, or over which it extends, from the zero end position the value or the number to be entered in that column. For example in Fig. 1 under the heading "Territory," the first column has a single opening 20 punched or cut in the zero position, and the second column is punched or cut for both the zero and first positions to indicate that it is the first territory, or territory number 1 for that entry. Accordingly, the opening 20 in that second column extends along the column for two positions, that is, it includes a zero position and extends into the number 1 position. In the column marked "Salesman," the number recorded in the first column is 2, which means that the opening 20 extends for 3 spaces, that is, from the 0 to the number 2 position inclusive.

The second column under this heading carries the numeral 1, and hence the opening 20 in that column extends for 2 spaces. In the third column the number recorded is 8, and hence the opening 20 extends for 9 spaces, that is, from the 0 position to the 8 position inclusive. The entry of the numerals 218 in the "Salesman" group of columns indicates that the salesman who handled the particular transaction that is kept by the record in this card, was identified by the number 218. Similar examples are expressed in the other columns, as will be obvious in Fig. 1, but it will be understood that the entries in different cards may vary with the data recorded thereon, and will not necessarily or usually be the same in each card.

All of the cards for any purpose will be of the same size and shape, such as shown in Fig. 1, with apertured tongues 6 at each of the upper corners, notches 8 and 9 in the edges intersecting to form the upper corners, and the sorting apertures and notches along the upper and lower edges of each card. All of the record cards will have on their interior, a number of printed columns with headings 2, spaces 4 for the entry of data by indicia, and the vertical columns. These columns are also preferably provided with the numerals 0 to 9 to facilitate the punching or cutting of the apertures or slots 20. The statistical data is introduced into these standard cards and this data may vary for each card. At the left of each card, in its interior, is an area 21 in which may be entered any other data for which a record is desired. It will be understood that this area 21 may be of any desired width so as to give adequate capacity, and if desired, a similar space may be provided near the right-hand end of the card. The apertures 20, representing the statistical data, may be formed by manually punching the columns with a hand punch to produce slots of the desired length, or they may be cut or punched therein in any manner or by any suitable machine, such as machines for cutting player piano rolls adapted for this purpose.

After the cards have had statistical data introduced or incorporated therein by the entry of items in the spaces 4 and the cutting of the apertures 20 to varying lengths all starting from the zero position, the cards are brought together in face to face, superposed relation, in a stack and can then be sorted and placed in any desired order, or the group may be arranged in any desired sequence, or any group of the cards may be easily segregated and withdrawn from the others.

The sorting may advantageously be done on a step like support, one example of which is illustrated in Figs. 1b and 1c that will now be described. This support includes a generally horizontal wall 22 and an upright wall 23 forming a dihedral angle of approximately 90° that may be called the lower deck, and at the top of the upright wall 23 I provide another generally horizontal and rearwardly extending wall 24. Upstanding from the rear of the wall 24 is another upright wall 25. The walls 24 and 25, between them, form another dihedral angle similar to that between the walls 22 and 23, and may be called the upper deck. The horizontal walls 22 and 24 are preferably given a slight downward inclination rearwardly so that the upright walls 23 and 25 will have a slight rearward tilt. The cards may be disposed in these dihedral angles with their lower edges resting on the horizontal walls 22 and 24 and the stacks leaning against the upright walls 23 and 25.

At the left-hand side of the horizontal wall 22 is an upright stop 26 which is adjustable to a limited extent lengthwise along the wall 22 to different distances from the left-hand end. This stop may be secured in different adjusted positions by a nut 27 carried on a stud 28 which extends from wall 22 upwardly through a horizontal arm or extension 29 of the stop 26. The horizontal arm 29 has a slot (not shown) extending in a direction from left to right of the support 22, so as to hold the stop 26 in the adjusted position. A similar adjustable stop is provided on the wall 24 and the parts for that stop and the means for holding it are given corresponding reference characters.

Each upright wall 23 and 25 is provided with a plurality of parallel grooves 30 extending from adjacent the bottom upwardly, preferably for the full height of the upright wall. These grooves 30 are spaced horizontally distances corresponding to the spacing between the columns in the cards. At the lower ends of these grooves 30 are locking recesses or holes 31, and similar holes 32 are provided in the upright walls at the upper ends of the grooves. The purpose of these holes 31 and 32 is to support pins as will appear later when the use of the device is explained. Approximately midway, horizontally, of the upright walls 23 and 25 are three reference lines 33, 34 and 35, and corresponding reference lines extend forwardly on the horizontal walls 22 and 24. The line 33 has adjacent thereto the expression "Lift odd" (see also Figs. 4 and 5), the line 34 has printed adjacent it the words "Lift even," and the line 35 has printed along it the word "Combine." These lines 33, 34 and 35 and identifying words on the horizontal walls 22 and 24 are shown in front of a stack of cards in Figs. 4 and 5.

The locking holes 31 need only be at every other groove or column, and in front of each of these holes 31 and 32 is a scale line 36 (Fig. 4) extending forwardly and identified by numerals. The group of numerals associated with lines 36 also bears the group designation "Lock." The scale line 36 nearest the line 35 has associated with it the numerals 0 and 1, the next line 36 has associated with it the numerals 2 and 3, the next line is designated by the numerals 4 and 5, and so on up to 10 and 11. The first scale line 36 having the numerals 0 and 1 is spaced from the line 34 a distance equal to that between the apertures 11, and the reference line 35 is midway between the line 34 and the first scale line 36. To the left of the reference line 33 designated as "Lift odd," are scale lines 37 spaced from each other and from line 33 the same distance as between the scale lines 36, which is a distance equal to that between adjacent apertures 11 in the cards.

The lines 37 extend forwardly and have numerals associated with each. The line 37 nearest to the line 33 is identified by the numerals 10 and 11 (Fig. 4), the next line 37 towards the left is identified by the numerals 8 and 9, the next line 37 by the numerals 6 and 7, and so on until the last scale line 37 of the group is designated by the numerals 0 and 1. Midway between these scale lines 37 are additional scale lines 38, and the scale line 38 which is nearest the line 33 is identified by the numerals 8 and 9. The next scale line 38 on the left is designated by the numerals 6 and 7. The next scale line 38 towards the left is designated by the numerals 4 and 5, and so on until the extreme left scale line 38 is designated by the numerals 0 and 1. All of the numerals at the left of the reference line 33 are marked "Sort."

After the cards have had entries made thereon, and also incorporated therein by apertures 20, they are arranged in face to face, superposed relation to form a stack, and disposed in a group on the lower horizontal wall 22 of the support 10 illustrated in Figs. 1b and 1c, which is the arrangement shown in Fig. 2, it being understood that the illustration in that figure is of a stack of cards that are all identical in size, shape and prepunching, except for the apertures 20 which are selectively formed in the columns. In all of the figures except Fig. 1, only one column has been shown in order to illustrate the manner of sorting the cards, but it will be understood that each card will have its full complement of columns and apertures 20 formed therein, as illustrated in Fig. 1. The column selected to illustrate the manner in which the cards are separated or sorted is that designated as "Territory" in Fig. 1, but the same manner of sorting cards may be applied for each of the other columns.

In sorting the cards, at least two needles or pins 39 having handles 40 are required, one of which needles is shown in perspective in Fig. 1a. With the cards arranged in a stack as shown in Fig. 2, and it being desired to sort the cards according to territory, one of the needles 39 is inserted through the stack of cards at the lower end or zero position of the second or right-hand column under the heading "Territory," it being understood that the zero position will always be punched in each column. In fact the zero position in each column may be prepunched in the cards if desired as they are supplied to the users.

The next step is to lift the needle vertically, while holding the point of the needle in a groove 30, and jiggling the needle and cards as they are lifted to allow the cards to settle into a fan-like arrangement, as shown in Fig. 3. In actual practice an electrically vibrated lifting needle may be employed, but to simplify the illustration as much as possible, an ordinary, manually operated needle 39 is illustrated. As the stack is lifted, the point of the needle after it clears the upper end of the groove in which it has been moved, may be tapped against the upper edge of the upright wall 23 a few times to aid in fanning out the cards. Since the apertures 20 in the columns through which the needle 39 passes are of different lengths, the vibration or jiggling will cause the cards to sag to different extents until the upper ends of all of the apertures or slots 20 in that column rest upon the needle 39, with the cards in the fan-like arrangement shown in Fig. 3. In doing this, it will be noted that the apertured tongues 6 will also be arranged in a fan-like group.

Those cards having apertures in only the zero position under the column "Territory" will be raised to the greatest extent, and those having the apertures 20 extending only to the 1 position will be raised to the next highest extent. Those cards having the apertures 20 in this particular column which extend only to the number 2 position will be raised to the next highest position, and so on for all of the cards. The operator or sorter then places the point of the needle 39 in one of the apertures 32 at the top of the upright wall 23, so that the needle will be held in that position, and with the cards fanned, as shown in Fig. 3.

A comb having its teeth or pins spaced apart approximately the distance between the apertures 7 in adjacent, spaced tongues 6 that are so fanned out, is positioned along the row of tongues 6 and with its teeth entering the apertures 7 of all of the fanned cards. The comb is either flexible to conform to the arc of the tongues 6 or has such a curvature. After the needle 39 is withdrawn from slots 20, the comb is then rotated either to the left or to the right, preferably to the left in Fig. 3, until the cards have the stepped relation shown in Fig. 4, it being understood that the notch 9 in each card, adjacent the tongues 6 engaged by the comb, allows all of the teeth of the comb to move into a horizontal position, with the cards in overrunning, stepped relation horizontally, as shown in Fig. 4. While an ordinary type of comb may be used for this last explained operation, it will be understood that in fanning the cards as shown in Fig. 3, the spacing between the apertures 7 in the corner tongues 6, for different adjacent positions will vary with the distance of the column from the opposite end of the stack of cards. Therefore I prefer to use a comb in which the pins or teeth can be adjusted to different spacings to facilitate the placing of the teeth or pins through the apertures 7.

One example of such a comb is shown in Fig. 1d. This is a lazy tongs device having a plurality of links 50 arranged in pairs crossing each other midway of their ends, pivoted at the crossing points by pins 41, and having the ends pivotally connecting to ends of the next adjacent pair. The pins 41 extend in directions normal to the abutting faces of the links which are so pivoted together, and these extended pins 41 serve as the pins or teeth which are inserted in the apertures 7 of the fanned cards while the cards are in the position shown in Fig. 3. The links 50 at one end of the lazy tongs are extended and provided with loops 42, so that by bringing the loops 42 towards each other, the lazy tongs structure may be extended, and by moving the loops 42 apart, the lazy tongs structure may be contracted. A spring 43 interposed between the end links having the loops 42 urges the loops 42 apart so as to contract the lazy tongs structure until washers 50a on adjacent pins 41 abut and stop the retraction, at which time the pins 41 will have the correct spacing for the cards in fanned relation in the extreme right-hand column of the card. When the lazy tongs are extended, the pivot pins will move apart uniformly and progressively in their spacing, and thus one may selectively and simultaneously space all of the pins 41 of the comb to the right positions to enter the apertures 7 in the corners of the fanned cards.

While the pins 41 of the comb are still engaged in the corners of the cards, and in the position shown in Fig. 4 (the teeth being the only part of the comb there shown), the cards in this stepped relation are then moved horizontally as a group on the wall 22 until the extreme left-hand card abuts against the stop 26 as shown in Fig. 4, where the faces of the dihedral angle have been swung into a straight line. It is assumed, for the purpose of this explanation, that there will always be a card with a zero punching in this column to determine this location of the group of cards, but to avoid any possibility that there might not be such a card with a zero spacing, I provide a pilot card 44 for this purpose which is identical with all of the other cards except that it has only zero spacings punched in all of the columns. Such a card is shown in Fig. 6a and it may be used repeatedly with different groups which are being sorted at any time and will not be mixed with the other cards when not in use.

With the stack of cards in this stepped relation shown in Fig. 4, and resting upon the lower deck, that is, upon the horizontal wall 22, with the zero card abutting or alined with the stop 26, the comb may be disengaged from the apertured tongues 6 and laid aside. If it is desired now, to segregate all of the cards having even numbers punched in the corresponding territory columns, from those cards having odd numbers punched in the same columns, the sorter places one of the needles 39 in the aperture 11 or notch 13 in the front card of the group, whichever aperture or notch is alined with the reference line 34 which is identified by the designation "Lift even," as shown in Fig. 4. The point of the needle 39 may enter the locking hole 31 (Fig. 1b) in the upright wall 23 along the even line 34.

While this needle 39 is held in this position in which it has passed through the cards, the sorter takes another needle 39 and passes it through the stack of cards at the aperture 10 or notch 12 which is immediately above the first pin 39 in the "Lift even" position in the front card. The upright walls 23 and 25 are higher than the cards to be sorted, and these lines 33, 34 and 35 are continued to the tops of the upright walls so that they will always be visible above the cards, and such reference lines may be used to find the proper aperture 10 or notch 12 which is alined with the reference mark 34. With this second needle 39 passed through all of the cards at the upper edges, the sorter then lifts this second needle 39 vertically, which lifts all of the cards through an aperture 10 of which the lifting needle passes, leaving those cards through a notch 12 of which the lifting needle passes.

Since the cards that were arranged in the stepped order shown in Fig. 4 have their zero cards extending the furthest to the left, the number 1 cards at the next step to the right, the number 2 cards at the next step to the right, and so on, the placing of the zero cards against the stop 26 served to so position the cards that those where the apertures 20 represented even positions would have a notch 13 along the lower edges at the points of alinement with the reference line 34, and the stop 26 is so adjusted that this will be the case. All of the cards having the apertures 20 terminating at their upper ends in odd positions in the columns will, by the same arrangement, have an aperture 11 alined with the same reference line 34. Thus, by inserting the locking needle 39 through the apertures and notches along the lower edge of the cards at the points that are alined with the line 34, it will pass through the apertures 11 in all of the cards representing odd positions of the apertures 20, and through the notches 13 along the lower edges of the cards where the openings 20 terminate in even positions.

Since the notches and apertures in the upper edge are staggered with respect to those in the lower, it follows that when the needle 39, which may be called the lift needle, is inserted through apertures and notches alined with the reference 34 at the upper edges of the cards, it will pass through the apertures 10 in the so called even cards and through the notches 12 in the odd cards. Then when the upper needle 39 is lifted, it will lift all of the even cards, and the lower needle 39 will lock and prevent the lifting of all of the odd cards. The lifted even cards are shown by dash lines at the top of Fig. 4.

The even cards carried by this upper or lift needle 39 are then transferred, as a body, to the upper deck or dihedral angle of the support shown in Figs. 1b and 1c, and deposited there in upright positions, with the extreme left-hand card abutting the stop 26 of the upper deck as shown in Fig. 5. The stop 26 of this upper deck will preferably be spaced to the right towards the graduations 37 and 38 a distance equal to that between an aperture and notch along the lower edge, for a purpose which will appear herein later. Assuming, for example, that the sorter wishes to remove all of the number 6 cards, that is, all of the cards in which the apertures 20 in the right-hand territory column terminate at their upper ends in the number 6 position in the column. This operation is illustrated in Fig. 5, and the even cards in the upper deck or dihedral angle are used for this purpose, because all of the number 6 cards will be in this group of even numbers on the upper deck. With the group of cards in this stepped relation disposed on the floor of the upper deck, with the zero card abutting with or alined with the stop 26, the procedure is as follows: A locking needle 39 is inserted through the cards in the apertures or notches of the lower edge which are alined with the graduation 36 that is identified by the numerals 6 and 7 under "Lock." Since this group contains only the even cards, the odd numbers on the graduations 36 may be disregarded. With the needle 39 so engaged and held in one of the locking holes 31 in the upright wall of the upper deck, the sorter moves the other or second needle 39, also called a lifting needle, along the group of graduations 38 which are marked "Sort" until that reference line 38 is reached which is identified with the numerals 6 and 7. Since this group of cards contains only the even numerals, there will be no number 7 cards to be considered.

The sorter then moves the lifting needle from this 6, 7 graduation line of the graduations 38 vertically to the upper edge of the group of cards and it is then inserted through the cards at the apertures and notches alined vertically with this particular graduation 38, as shown in Fig. 5. With the lower needle 39 still in position, the sorter lifts the second needle 39 which will lift all of the number 6 cards. There will either be a notch in all of the other cards alined with this second needle 39 at this particular graduation 38, or there will be a notch 9 in the upper edge of the card alined therewith, so that when the second needle 39 is lifted, it will remove only the number 6 cards. There will be a notch in all the other cards through which the locking needle passed at the lower margin so that the lifted cards would be released. The lifted number 6 cards are shown by dash lines in Fig. 5 being slightly elevated. Any other even numbered cards may be removed from this group of even numbers in a similar manner.

Assuming, for example, that the sorter wishes to remove all of the number 3 cards, that is, all of the cards in which the apertures 20 of the right-hand territory column terminate at their upper ends in the 3 position, the sorter would refer to the "odd" cards on the lower deck and would insert one needle through the cards at their lower margins in the apertures or notches alined with the scale graduation 36 designated by the numerals 2 and 3. Holding that needle in that position through the cards, another or lifting needle is moved to the left into the group marked "Sort" to the scale graduation 38 designated by the numerals 2 and 3, and then the lifting needle is moved upwardly while free of the cards to a position directly above this scale mark 38, to the openings or notches immediately above and alined with this particular scale mark, and there it is inserted through the apertures of the cards at that point. Since the scale marks 37 and 38 are extended above the cards on the upright wall and are so marked, it is easy to find the proper place to insert this lifting needle 39. The operator then lifts this second needle, and it will lift all of the number 3 cards.

Assuming now, for example, that one desires to arrange the cards in numerical sequence according to the numbers in the second column under the topic "Territory," the procedure is illustrated in Figs. 6 and 7. After the cards have been arranged, as shown by full lines in Fig. 4 on the lower deck, and even numbers have been lifted as previously explained and as shown by the dash lines in Fig. 4, this group of even cards, instead of being placed on the upper deck in the position shown in Fig. 5, are placed in front of the odd group of cards on the lower deck, as shown in Fig. 6, but before placing the separated cards on the lower deck, the first or locking needle is withdrawn from the notches and apertures in the lower margins of the odd cards at the line marked "Lift even," moved one space to the right and inserted through the notches by apertures in the lower margins of the cards that are alined with the line marked "Combine." The lifted group of even cards are then placed in front of the odd cards with the lifting needle of the even cards vertically alined with the holding needle at the reference line marked "Combine." With the cards assembled in this manner, the holding needle is withdrawn and reinserted into the alined aperture and notches at the lower margins of the cards at the reference graduation 36 which is designated by the numerals 0 and 1.

The needle is passed entirely through the group of cards at this point until it enters one of the locking holes 31 in the upright wall, and with this needle held in this position, the sorter takes the other or lifting needle 39, moves it along the "Sort" group of graduations 38 until he finds the graduation 38 which is designated by the numerals 0 and 1. This lifting needle is then moved vertically to the notches and apertures along the upper edges of the cards which are vertically alined with this graduation 38 as shown in Fig. 6, and with the first or locking needle 39 still held in locked position in the hole 31 in the upright wall, the operator lifts the second needle 39 which will lift all of the 0 and 1 cards together, as shown by dash lines in Fig. 6. Since the even numbers were placed in front of the odd numbers in a group, the 0 cards will be in front of the 1 cards, and these cards are lifted as a group and placed flat upon a support 45, Fig. 7, face down.

The sorter then inserts the lifting needle 39 through the apertures and notches in the lower edge of the group of cards at the point alined with the graduation 36 that is identified by the numerals 2 and 3, with the needle secured in a hole in the rear wall as previously explained. The sorter then moves the other or lifting needle along the "sort" graduations 38 until he locates the graduation 38 that is identified by the numerals 2 and 3. He then moves the lifting needle vertically until he reaches the upper edges of the cards and then inserts it through the apertures and notches at the upper edges that are alined with this graduation 38 identified by the numerals 2 and 3. The second needle 39 is then lifted to lift out all of the number 2 and 3 cards in the same manner that the 0 and 1 cards were lifted. Since the even numbers were placed in front of the odd numbers in the group, all of the 2 cards will be in front of the 3 cards, and these lifted cards 2 and 3 will then be placed face down on the support 45 on top of all of the 0 and 1 cards.

In a similar manner the number 4 and 5 cards are lifted and placed face down upon the support 45 on top of the 0, 1, 2 and 3 cards. This lifting or segregation operation continues in this manner until all of the cards are piled up in the manner shown in Fig. 7. When this has been completed, all of the cards will be arranged numerically in consecutive order. That is, all of the 0 cards will be together, then all of the 1 cards, then all of the 2 cards, and so on in this order.

In Figs. 8 and 9 I have illustrated a sample card which is similar to the cards illustrated and described in connection with Figs. 1 to 7, except that the columns have greater vertical heights or lengths in order to give increased capacity for the entries. For example, if one of the topics was the "Month," as in Fig. 1, it would be more convenient to have only one position record the month, and 0 could designat the 10th month, the 11th position would designate the 11th month and the 12th position could designate the 12th month, because there would be no zero months under such a topic. For this reason there need be no special "10" position in the month column, and the designations would then run from 0 to 9, then the next would be 11, then the next would be 12. When considering amounts, such as in an amount column, the 11th position in the column would be considered the same as 10, and the 12th position would be considered as 11, so that the maximum amount that could be entered in such a column would be $11,999.99.

Inasmuch as this card is similar to the other cards except for these extra positions in the columns, the same reference characters for corresponding parts have been applied to the cards in Figs. 8 and 9 as were applied to the cards in Figs. 1 to 7, and the use of such cards would be similar. It will be understood, however, that when these extra positions are added to the vertical columns, it will be necessary to form two additional pre-punched apertures and notches along both the top and bottom margins of the cards, and the notches 8 and 9 must be also similarly longer. The graduations 37 on the horizontal decks 22 and 24 will also be utilized, instead of graduations 38, it being noted that these graduations 37 are spaced to the left in Figs. 4 to 6 to a greater extent than the graduations 38 in order to provide for the increased capacity, but their use is otherwise similar to the use of graduations 38. The guide 26 can be also moved to the left when using cards of this type. Two additional minor pre-punched apertures 18 and notches 19 are also necessary along the bottom edge of the card at the left side, to adapt the cards for use of the increased spaces 11 and 12.

In Figs. 10 and 11 another modification of the invention is illustrated, and in this form of the invention the columns are made considerably wider than in the other forms, as shown in Fig. 11. The 0-2-4-6-8 positions are arranged along the left-hand side of each column and the odds or 1–3–5–7–9 positions are arranged along the right-hand side of that column. The 0 and 1 positions are on the same level and arranged a substantial distance above the former 0 position described in connection with Figs. 1 to 9. The slots or apertures 20a which correspond to the apertures or slots 20 in Figs. 1 to 9 are formed along the sides of the columns having their lower portions below the 0 or 1 position extended into the middle position at a point where the former 0 position was located. In this manner from the bottom of each aperture or slot 20a there will be an inclination, either to the left or to the right and of substantial length, before the slot reaches either the 0 or 1 position. In the left-hand column of Fig. 11 the number entered in the record is 8, whereas in the right-hand column the number entered is 3. In Fig. 11, the slot 20a in the left-hand column is inclined to the left to the 0 position and then vertically to the 8 position, and the slot 20a for the right-hand column is first inclined to the right until it reaches the 1 position, then it moves vertically to the 3 position.

In other words, in punching the aperture 20a in a card, if the number is even, the lower part of the aperture is inclined to one side in that column, as shown in the left column in Fig. 11, and if the number is an odd number, the lower part of the slot 20a is inclined oppositely, so as to reach the right-hand part of the column by the time the first of the positions or graduations is reached. When this type of card is used, the cards, after the records have been made thereon in any desired order, are assembled in a stack in face to face relation, and then for each column the sorter inserts a lifting needle through all of the cards at the bottoms of the slots 20a in any column, because the lower ends of the slots 20a in all of the cards for any column will be alined. The sorter then lifts that needle with accompanying vibration or jiggling, and this action will cam the cards sidewise, the evens to the right and the odds to the left, as shown in Fig. 10 where the needle in the first column is partway up in its lifting operation.

In this example, when the needle 39 is lifted while in the apertures or slots 20a, the action between the needle and the inclined parts of the slots 20a leading to even number positions in the column will cam all of the even cards to the right, and similarly, the cam action between the needle 39 and the inclined parts of the slots 20a leading to the odd number positions in the column, will cam the odd number cards to the left. The lifting and jiggling operation continues until the cards have been fanned out in the manner shown in Fig. 3, except that, by reason of the fact that the portions of the slots at the figures are displaced sidewise for odds and evens, the odd cards will all be displaced further to the left in the fanned relation than are the even cards. The sorter then inserts a comb through the apertures 7 of the tongues 6 of the fanned group of even cards which are exposed. After that is done, the lifting needle is withdrawn and the operator then lifts the comb with the attached even cards from the group, which serves to separate the odds and the evens. The even cards are then placed on the upper deck and the comb turned to place the cards in a stepped relation somewhat similar to that shown in Fig. 4. In that relation the even cards will all be arranged in a stepped relation in sequence according to the numbers of the positions.

A needle is then re-inserted through the apertures 20a in the same column for the group of odd cards and lifted and jiggled to cause the cards to be fanned again, and then the comb may be inserted through the apertures 7 in the tongues 6 of the fanned cards. The odd cards are then placed in stepped relation to each other by rotation of the comb into the position shown in Fig. 4. If one desires to combine the cards, the evens may be transported as a group, while in the same relation to each other, to a position in front of the odd cards on one of the decks, and the groups combined as described previously in connection with the combining of the odd and even groups of cards. If desired, each of these cards may have a horizontally elongated slot 46 (Fig. 10) in the lower left-hand corner and then when the cards are fanned by a lifting needle, the odd cards will be displaced horizontally in the lower left-hand corners far enough so that the ends of the slots 46 in the odd cards will be exposed to view from the front, and a locking needle may be inserted through those exposed slots 46 to hold the odd cards against movement while the sorter lifts the even cards from the group. In Figs. 10 and 11 the various parts of the cards are given the same reference characters as corresponding parts in Figs. 1 to 9, except for the reference to slots 46 and to the column apertures as 20a instead of 20.

In Figs. 12 and 13 another embodiment of the invention is illustrated in which the cards are similar to those shown in Figs. 1 to 9, except that the columns, instead of running vertically, are arranged to progress horizontally or parallel to the longer edges of the cards. The cards have their apertures 20 formed therein of different lengths as in Figs. 1 to 9. In sorting or grouping cards of this type, the lifting needle 39 is inserted through the apertures of the cards in a particular column, the same as explained in connection with Figs. 1 to 9, but in lifting the cards they are held with their longer edges vertical and the jiggling will then cause the cards to fan out in a straight line as shown in Fig. 12, the 0 cards being the highest ones, the 1 cards the next highest, and so on.

After the cards have been arranged in stepped relation in this manner, they are then placed upon one of the decks after which any group of cards may be easily removed from the others in the manner explained in connection with Figs. 1 to 7. This style of punching has some advantages over the vertical punching in the columns, in that the fanning operation is eliminated and the cards are automatically stepped into the 0–1–2–3–4–5–6–7–8–9 order during each needling operation. The stepping operation is also automatic when the 11th and 12th positions in the columns are used. It is also possible to make the cards as long as desired in order to give the requisite number of columns. Less pre-punched positions are required, and the cut-out positions or notches 8 and 9 in the cards that were necessary for fanning are no longer necessary.

If desired, in order to simplify the fanning operation, the cards in any of the illustrated examples, can be provided with a duplicate set of columns, one set in one half of the cards and the other set in the other half, but similarly arranged. In the lifting operation two lifting needles are used and inserted in the corresponding columns at the 0 positions at the same time, and lifted simultaneously, which will automatically lift the cards directly into the proper stepped relation, with the 0 cards in the highest position, the 1 card directly below, and so on in numerical order. While in this order a comb can have its pins or teeth inserted into the holes 7 in the tongues 6 of the upper right-hand corners of the forms, or in the upper left-hand corners, after which the needles are removed and the comb turned into a horizontal position to place the forms in the 0–1–2–3, etc. order on a deck, after which the cards may be separated by sorting in the manner explained in connection with Figs. 1 to 7. It will, of course, be understood that the cards may be increased in length or height in order to give additional areas in which printed or written records may be entered, but a sorting and segregation operation will be the same for such cards.

The fanning operation of the cards, when they are lifted by lifting needles inserted through the apertures 20 or 20a of the cards, has been described in connection with the apertured tongues at the upper right-hand corners of the cards, but a similar fanning operation can advantageously be performed at the left-hand upper corners if the columns are nearer the left-hand edges of the cards. It is for this reason that the upper left-hand corners also preferably have the tongues 6 with apertures 7, and the notches 8 and 9 in the edges intersecting at the upper left-hand corners. The notches 9 in the left-hand part of the upper edge allow the comb to turn into a horizontal position when arranging the cards in a stepped relation similar to Fig. 4 while the comb is inserted in the lugs or tongues in the upper left-hand corners. The notches 8 in the left-hand edges of the cards make it possible for the comb to go through the fanned tongues 6 at the upper left-hand corners.

Each tongue 6 can be formed by notching the intersecting edges of a card or by having the tongue extend beyond the intersecting edges of the card, but paper stock is conserved by the arrangement shown in which the tongues 6 are formed by cutting the notches 8 and 9 in the intersecting edges. It will also be noted that the minor group of notches and apertures in the lower edge of each card, see Fig. 1, may be replaced by a single long notch, as shown in Fig. 14 where the notch 18a replaces them. As will be seen from Figs. 4 to 6, after the cards have been fanned and arranged in groups for sorting, the minor group of apertures and notches 18 and 19, or a single long notch may overrun horizontally with some of the major group, and hence the minor apertures and notches or the long notch is necessary to avoid interference in sorting. Note in the upper edges of the cards in Fig. 4, how the apertures 10 and notches 12 therein are exposed through long notch 9 so that one may insert the lifting pin at the proper place. The same necessity for clearance exists in the lower edge and this clearance can be obtained by a single long notch similar to notch 9, or by extra notches and apertures called "minor." The minor group of notches and apertures can also be eliminated if the major group is started at the extreme left of the lower edge as shown in Figs. 12 and 13. It will also be observed that the tongues 48 at the lower left and right-hand corners may be omitted by extending the notches 8 fully to the lower edge. This would not interfere with the functioning of the device except that the guides or stops 26 would have to be so positioned that the edges of the cards would engage against them at the proper positions. In Fig. 15 a slight modification is illustrated, in which the notches 9 in the upper edges of the cards have been replaced by a plurality of uniformly spaced, relatively narrow notches 9a opening through the upper edges of the cards and which the comb teeth can enter when the cards are moved by the comb from fanned relation into the horizontally stepped relation. Similarly, the minor group of apertures and notches, or the long notch 18a, can be replaced by regularly spaced narrow notches 18b opening through the lower edges of the cards so that when a locking needle is inserted through any of the stepped cards along the lower edge, it will clear any of the cards having their minor group of apertures and notches, or equivalent zone, overlapping a major aperture in the lower edge of another card.

The extra aperture 14 in the upper edge (see Fig. 1) need not be used if one desires to sort the cards one by one, in which case it might be necessary to make at least 10 separate sortings where there are 10 positions in the columns. This extra aperture 14 is used when one desires to combine the two groups and sort the cards two at a time as explained in connection with Figs. 6 and 7. The extra notch 16 in the lower edge of each of the cards is also necessary when one desires to combine the odds and even groups of cards so that they may be sorted two at a time, because one would not be able to move the evens one space to the right, in combining them with the odds unless there were the two adjacent notches at this point.

If one did not desire to combine the odd and even groups, so that the sorting needling operation could be cut in half through sorting of two groups of cards at a time, (all of the 0–1 cards, then all of the 2–3 cards, etc.) one could omit or ignore the row of notches and apertures on the upper edge and lift the cards according to column positions by lifting needles inserted through the apertures 7 of the fanned lugs 6. This may disturb the fanned arrangement of the other cards however, and is not preferred. If desired, one might also have one of the comb pins longer than the other to engage in the back wall and serve as a pivot in the rotation of the comb to produce a stepped relation, but this is not necessary.

The number of topics, columns, and spaces or positions in any column for any card may vary widely with the information to be recorded. Some jobs will require cards with only a few topics, columns and positions, whereas others may require cards with more than have been shown. The size of the cards will be uniform for any job, but may be different for different jobs where more or less entries are required. The record areas may be multiplied, as shown, for example, in Fig. 12, in order to give any desired record capacity.

The sorting and locking apertures and notches, in the upper and lower edges of the cards can be positioned close to the extreme left-hand edge, as shown in Figs. 12 and 13, in order to avoid the necessity of using minor punchings 18 and 19, or the equivalent notch 18a (Fig. 14). In Figs. 10 and 11, it is optional whether the lower ends of the slots 20a are inclined to the left or the right for "evens" or "odds" so long as they are inclined one way for the "evens" and the opposite way for the "odds," but the arrangement shown is preferred since it places the "0" cards the furthest to the left, which is a less confusing arrangement.

It will be understood that various changes in the details, materials and arrangements of parts, which have been herein described and illustrated in order to explain the nature of the invention, may be made by those skilled in the art within the principle and scope of the invention as expressed in the appended claims.

I claim:

1. An improved standard, uniform record blank card into which pertinent information can be introduced and by which that card may be separated from others by sorting, which comprises a standard, uniform sheet having an apertured, projecting tongue at one corner, a plurality of correspondingly disposed, printed parallel index columns in the interior of the sheet, in each column of which may be formed openings of selectively variable lengths along the columns all starting from one corresponding end thereof to record-selected information, two groups of apertures, the apertures of one group being a plurality and arranged in a row along the upper edge of the sheet, and all apertures of said groups being uniformly spaced apart in the row and from the adjacent edge, the apertures of the other group being also a plurality and arranged in a row along the lower edge of the sheet, the said apertures of the row along said one edge being staggered vertically midway with respect to those along the other edge, and a plurality of edge sorting notches interposed one midway between each adjacent pair of said apertures in each row, all of said notches extending vertically into the sheet until their inner ends are horizontally alined with the adjacent apertures.

2. An improved standard, uniform record blank card into which pertinent information can be introduced and by which that card may be separated from others by sorting, which comprises a standard, uniform sheet having an apertured, projecting tongue at one corner, a plurality of correspondingly disposed, printed parallel index columns in the interior of the sheet, in each column of which may be formed openings of selectively variable lengths along the columns all starting from one corresponding end thereof to record-selected information, two groups of apertures, the apertures of one group being a plurality and arranged in a row along the upper edge of the sheet, and all apertures of said groups being uniformly spaced apart in the row and from the adjacent edge, the apertures of the other group being also a plurality and arranged in a row along the lower edge of the sheet, said apertures of the row along said one edge being staggered vertically midway with respect to those along the other edge, and a plurality of edge sorting notches interposed one midway between each adjacent pair of said apertures in each row, all of said notches extending vertically into the sheet until their inner ends are horizontally aligned with the adjacent apertures, said sheet having at one end of the row of said apertures along one edge, two of said sorting notches in succession and spaced apart the same distance as that between a sorting notch and an aperture, and at the opposite end of the row of apertures along the other edge, two apertures in succession and spaced apart the distance between a sorting notch and aperture of the group along that edge.

3. An improved standard uniform record blank card into which pertinent information can be introduced and by which that card may be separated from others by sorting, which comprises a uniform sheet having in its interior correspondingly disposed, printed, parallel, equal length, index columns starting from alined ends in which may be formed openings of selectively variable lengths to different positions along the columns from corresponding alined starting ends thereof to record information by selectively varying the lengths of the slots, and also having an apertured tongue projecting from one corner of the sheet, one of the intersecting edges at the corner being parallel to the lengths of said columns, each of said intersecting edges of said sheet having clearance notches extending along that edge for a substantial distance from said tongue that is not less than the maximum lengths of said columns, and for a depth at least as large as the distance of the aperture of said tongue from said one edge.

4. An improved standard, uniform record blank card into which pertinent information can be introduced and by which that card may be separated from others by sorting, which comprises a uniform sheet having in its interior correspondingly disposed, parallel, printed index columns in which may be formed openings of selectively variable lengths, all starting from one corresponding end, to different positions along the columns from corresponding ends thereof to record selected information, said sheet also having an apertured projecting tongue at one corner, and a clearance notch extending from adjacent said tongue a distance along each edge from said corner not less than the lengths of said columns, and also having two groups of apertures, the apertures of one group being a plurality and arranged in a row along one of said edges of the sheet, and the apertures of the other group being also a plurality and arranged in a row along the edge opposite and parallel to said one of said edges of the sheet, all of said apertures of each of said groups being uniformly spaced apart in the row and from the adjacent edge along which the row extends, the apertures of the row on one edge being staggered midway with respect to those along the other edge, considered in a direction between said edges, and an edge sorting notch interposed midway between each adjacent pair of said apertures in each row, all of said sorting notches extending into the sheet in a direction normal to that adjacent edge until their inner ends are alined with the adjacent apertures in a direction parallel to that edge.

5. An improved standard, uniform record blank card into which pertinent information can be introduced and by which that card may be separated from others by sorting, which comprises a uniform sheet having in its interior correspondingly disposed, parallel, printed index columns in which may be formed openings of selectively variable lengths, all starting from one corresponding end, to different positions along the columns from corresponding ends thereof to record selected information, said sheet also having an apertured projecting tongue at one corner, and a clearance notch extending from adjacent said tongue a distance along each edge from said corner not less than the lengths of said columns, and also having two groups of apertures, the apertures of one group being a plurality and arranged in a row along one of said edges of the sheet, and the apertures of the other group being also a plurality and arranged in a row along the edge opposite and parallel to said one of said edges of the sheet, all of said apertures of each of said groups being uniformly spaced apart in the row and from the adjacent edge along which the row extends, the apertures of the row on one edge being staggered midway with respect to those along the other edge, considered in a direction between said edges, and an edge sorting notch interposed midway between each adjacent pair of said apertures in each row, all of said sorting notches extending into the sheet in a direction normal to that adjacent edge until their inner ends are alined with the adjacent apertures in a direction parallel to that edge, the number of apertures in each row being at least the maximum number of positions in said columns along which the column openings may be cut.

6. An improved standard, uniform record blank card into which pertinent information can be introduced and by which that card may be separated from others by sorting, which comprises a uniform sheet having in its interior correspondingly disposed, parallel, printed index columns in which may be formed openings of selectively variable lengths, all starting from one corresponding end, to different positions along the columns from corresponding ends thereof to record information, said sheet also having an apertured projecting tongue at one corner, and a clearance notch extending from adjacent said tongue a distance along each edge from said corner not less than the lengths of said columns, and also having two groups of apertures, the apertures of one group being a plurality and arranged in a row along one of said edges of the sheet, and the apertures of the other group being also a plurality and arranged in a row along the edge opposite and parallel to said one of said edges of the sheet, all of said apertures of each of said groups being uniformly spaced apart in the row and from the adjacent edge along which the row extends, the apertures of the row on one edge being staggered midway with respect to those along the other edge, considered in a direction between said edges, and an edge sorting notch interposed midway between each adjacent pair of said apertures in each row, all of said sorting notches extending into the sheet in a direction normal to that adjacent edge until their inner ends are alined with the adjacent apertures in a direction parallel to that edge, said other edge of said sheet having additional apertures arranged in the same row beyond said sorting notches, with the same spacing as the other apertures in that row, and amounting in number to at least ½ the number of possible positions that may be cut in said columns.

7. An improved record card into which pertinent information can be introduced and by which that card may be separated from others by sorting, which comprises a sheet having in its interior correspondingly disposed, parallel, printed index columns of uniform length in which may be formed openings of selectively variable lengths to different positions along the columns from corresponding alined ends thereof to record information, said sheet also having an apertured projecting tongue at one corner, and a clearance notch extending from adjacent said tongue a distance along each edge from said corner not less than the lengths of said columns, and also having two groups of apertures, the apertures of one group being arranged in a row along one of said edges of the sheet, and the apertures of the other group being arranged in a row along the edge opposite and parallel to said one of said edges of the sheet, all of said apertures of said groups being uniformly spaced apart in the row and from the adjacent edge along which the row extends, the apertures of the row on one edge being staggered midway with respect to those along the other edge, considered in a direction between said edges, and an edge sorting notch interposed midway between each adjacent pair of said apertures in each row, all of said sorting notches extending into the sheet in a direction normal to that adjacent edge until their inner ends are alined with the adjacent apertures in a direction parallel to that edge, the upper edge of said sheet, in a direction along the sheet away from the corner having the projecting apertured tongue having clearance notches from a zone adjacent the end apertures of the rows furthest from said corner, for a distance greater than the lengths of said columns.

8. An improved record card into which pertinent information can be introduced, and by which said card may be separated from others by sorting, which comprises a sheet having in its interior correspondingly disposed, parallel, printed index columns of uniform length with corresponding ends alined, in which may be formed openings of selectively variable lengths from corresponding zero starting positions in order to record information by the lengths of the openings along the columns to different positions from zero positions, said sheet having an opening in one corner spaced from both of the intersecting edges at that corner, said intersecting edges having clearance notches therein extending from adjacent the opening, along said edges for a distance not less than the lengths of the columns, and having a depth not less than that which places the bottom of the clearance notch in alinement with the portion of the opening furthest from that edge having that notch.

9. An improved record card into which pertinent information can be introduced, and by which said card may be separated from others by sorting, which comprises a standard, uniform sheet having in its interior correspondingly disposed, parallel, printed index columns in which may be formed openings of selectively variable lengths from corresponding zero starting positions in order to record information by the lengths of the openings along the columns to different positions from zero positions, said sheet having an opening in one corner spaced from both of the intersecting edges at that corner, said intersecting edges having clearance notches therein extending from adjacent the opening, along said edges for a distance not less than the lengths of the columns, and having a depth not less than that which places the bottom of the clearance notch in alinement with the portion of the opening furthest from that edge having that notch, said sheet also having along one of said intersecting edges a group of a plurality of apertures arranged in a row, spaced uniformly apart in the row and from that edge of the sheet, the opposite parallel edge of said sheet having a similar row of a plurality of apertures but staggered midway with respect to those in said first group, considered in a direction between said parallel edges, said sheet also having along said parallel edges having said rows of apertures, edge sorting notches extending into the sheet from the adjacent edge a distance not less than that which places the inner ends of the sorting notches in alinement with the portions of the apertures of the adjacent row that are furthest from that adjacent edge, said sorting notches being disposed midway between said apertures, said apertures in each group in each row being in number not less than ½ the number of spaces in said columns.

10. An improved record card into which pertinent information can be introduced and by which said card may be separated from others by sorting, which comprises a standard, uniform sheet having in its interior correspondingly disposed, parallel, printed index columns in which may be formed openings of selectively variable lengths from corresponding zero starting positions in order to record information by the lengths of the openings along the columns to different positions from zero positions, said sheet having an opening in one corner spaced from both of the intersecting edges at that corner, said intersecting edges having clearance notches therein extending from adjacent the opening, along said edges for a distance not less than the lengths of the columns, and having a depth not less than that which places the bottom of the clearance notch in alinement with the portion of the opening furthest from that edge having that notch, said sheet also having along one of said intersecting edges a group of a plurality of apertures arranged in a row, spaced uniformly apart in the row and from that edge of the sheet, the opposite parallel edge of said sheet having a similar row of a plurality of apertures but staggered midway with respect to those in said first group, considered in a direction between said parallel edges, said sheet also having along said parallel edges having said rows of apertures, edge sorting notches extending into the sheet from the adjacent edge a distance not less than that which places the inner ends of the sorting notches in alinement with the portions of the apertures of the adjacent row that are furthest from that adjacent edge, said sorting notches being disposed midway between said apertures, said apertures in each group in each row being in number not less than ½ the number of spaces in said columns, said first row terminating at the end furthest from said corner with the opening, with two of said apertures spaced apart and from the end aperture of the group a distance equal to that between a sorting notch and an aperture in the group, and the other row terminating at the end nearest said corner in two sorting notches having the same spacing from each other and from the last aperture in the row as that between an aperture and sorting notch in the row, and also having from said two adjacent sorting notches towards said end having said corner another group of apertures arranged in a row coincident with said second row, spaced from the adjacent end sorting notch and from each other a distance equal to the distance between the apertures in that row, said another group of apertures being in number, not less than ½ the number of said positions in said column minus 1.

11. An improved record card into which pertinent information can be introduced and by which said card may be separated from others by sorting, which comprises a standard, uniform sheet having in its interior correspondingly disposed, parallel, printed index columns in which may be formed openings of selectively variable lengths from corresponding zero starting positions in order to record information by the lengths of the openings along the columns to different positions from zero positions, said sheet having an opening in one corner spaced from both of the intersecting edges at that corner, said intersecting edges having clearance notches therein extending from adjacent the opening, along said edges for a distance not less than the lengths of the columns, and having a depth not less than that which places the bottom of the clearance notch in alinement with the portion of the opening furthest from that edge having that notch, said sheet also having alone one of said intersecting edges a group of a plurality of apertures arranged in a row, spaced uniformly apart in the row and from that edge of the sheet, the opposite parallel edge of said sheet having a similar row of a plurality of apertures but staggered midway with respect to those in said first group, considered in a direction between said parallel edges, said sheet also having along said parallel edges having said rows of apertures, edge sorting notches extending into the sheet from the adjacent edge a distance not less than that which places the inner ends of the sorting notches in alinement with the portions of the apertures of the adjacent row that are furthest from that adjacent edge, said sorting notches being disposed midway between said apertures, said apertures in each group in each row being in number not less than ½ the number of spaces in said columns, said first row terminating at the end furthest from said corner with the opening, with two of said apertures spaced apart and from the end aperture of the group a distance equal to that between a sorting notch and an aperture in the group, and the other row terminating at the end nearest said corner in two sorting notches having the same spacing from each other and from the last aperture in the row as that between an aperture and sorting notch in the row, and also having from said two adjacent sorting notches towards said end having said corner another group of apertures arranged in a row coincident with said second row, spaced from the adjacent end sorting notch and from each other a distance equal to the distance between the apertures in that row, said another group of apertures being in number, not less than ½ the number of said positions in said column minus 1, one of said edges with said rows of apertures also having a clearance notch disposed beyond the ends of said rows and extending in directions away from said end of the sheet having said corner, and over a distance not less than the lengths of said columns.

12. A card sorting system comprising a plurality of record cards, each of which has, in its interior, correspondingly disposed, parallel, printed index columns in which may be formed openings of selectively variable lengths to different positions along the columns from corresponding zero end positions thereof to record information, and which also have apertured tongues at corresponding corners thereof, each of said cards having a clearance notch in each of the intersecting edges forming said corner with a depth not less than that which places its bottom edge approximately tangent to the aperture of the adjacent tongue, and for a length at least equal to the lengths of said columns, each card also having, along one of said intersecting edges, a group of a plurality of apertures spaced evenly apart and arranged in a row parallel to said one edge, the opposite, parallel edge of each card also having a similar row of a plurality of apertures, but with apertures staggered midway with respect to those of the first row in a direction between the edges having said rows, each of said parallel edges also having edge sorting notches extending therein from the adjacent edge a distance not less than that which places the inner ends of the sorting notches in alinement with the portions of the apertures furthest from that adjacent edge, said sorting notches along each edge being arranged in a row and disposed with one midway between each pair of said apertures along that adjacent edge, one of said cards having openings formed in said columns solely in the zero positions representing one space only from corresponding ends of said columns, and serving as a pilot card.

13. A card sorting system comprising a plurality of record cards, each of which has, in its interior, correspondingly disposed, parallel, printed index columns in which may be formed openings of selectively variable lengths to different positions along the columns from corresponding zero end positions thereof to record information, and which also have apertured tongues at corresponding corners thereof, each of said cards having a clearance notch in each of the intersecting edges forming said corner with a depth not less than that which places its bottom edge approximately tangent to the aperture of the adjacent tongue, and for a length at least equal to the lengths of said columns, each card also having, along one of said intersecting edges, a group of a plurality of apertures spaced evenly apart and arranged in a row parallel to said one edge, the opposite, parallel edge of each card also having a similar row of a plurality of apertures, but with the apertures staggered midway with respect to those of the first row in a direction between the edges having said rows, each of said parallel edges also having edge sorting notches extending therein from the adjacent edge a distance not less than that which places the inner ends of the sorting notches in alinement with the portions of the apertures furthest from that adjacent edge, said sorting notches along each edge being arranged in a row and disposed with one midway between each pair of said apertures along that adjacent edge, one of said cards having openings formed in said columns solely in the zero positions representing one space only from corresponding ends of said columns, and serving as a pilot card, said apertures in the first mentioned row terminating at the end furthest from said corner in two apertures spaced apart a distance equal to the distance between a sorting notch and an aperture in that row, and the opposite edge of said sheet having at the end of said group nearest the end having said corner, two sorting notches spaced apart at a distance equal to the distance between an aperture and a sorting notch, and beyond said two adjacent sorting notches, a plurality of apertures spaced apart a distance equal to that between the apertures of said group along that edge, and alined with the other apertures in that row, and equal in number to at least one less than half the number of positions in said columns.

14. A device for use in sorting cards which comprises a generally L-shaped upright support, in the dihedral angle of which the cards to be sorted may be disposed in upright positions, resting upon the base of the L and leaning against the upright wall of the L, the upright wall of the L having a plurality of vertically extending, parallel grooves spaced apart a distance corresponding to that between adjacent columns in the cards to be sorted.

15. A device for use in sorting cards which comprises a generally L-shaped upright support, in the dihedral angle of which the cards to be sorted may be disposed in upright positions, resting upon the base of the L and leaning against the upright wall of the L, the upright wall of the L having a plurality of vertically extending, parallel grooves spaced apart a distance corresponding to that between adjacent columns in the cards to be sorted, said upright wall extending to a height well above the upper edges of the cards to be sorted, and having adjacent its top a recess in which a lifting pin for the cards may be removably supported with the cards in stepped relation to each other.

16. In a card sorting system of the type having a plurality of record cards, each of which has, in its interior, correspondingly disposed, parallel index columns in which are formed openings of selectively variable lengths to different positions along the columns from corresponding end positions thereof, to record information, and which also have rows of apertures and notches along upper and lower edges by the use of which the cards may be sorted, that improvement which comprises a support for said cards to facilitate their sorting having generally horizontal and upright walls forming between them a dihedral angle of approximately 90° with a stop at one end of the dihedral angle against which the end edges of the cards may abut, whereby when the cards are placed on their edges on the horizontal wall, they may lean against the upright wall and be supported thereon in a stable position, the horizontal wall having graduations and indicia extending forwardly from the rear wall at the correct distances from said stop, and spaced apart according to the spacing between said notches and apertures in the marginal edge portions of the cards, the upright wall of said angle having parallel grooves extending vertically and spaced apart distances corresponding to the distances between columns to facilitate lifting of said cards by pins inserted in the openings of any column.

CLOYD E. BURNS.

REFERENCES CITED

The following references are of record in the file of this patent:

UNITED STATES PATENTS

| Number | Name | Date |
|---|---|---|
| 999,991 | Hargrave | Aug. 18, 1911 |
| 1,235,502 | Robinson | July 31, 1917 |
| 1,260,705 | Peirce | Mar. 26, 1918 |
| 1,317,684 | Brown | Oct. 7, 1919 |
| 1,404,611 | Hoag | Jan. 24, 1922 |
| 1,748,692 | Adams | Feb. 25, 1930 |
| 1,994,897 | Owen | Mar. 19, 1935 |
| 2,109,820 | Desaubliaux | Mar. 1, 1938 |
| 2,177,106 | Harper | Oct. 24, 1939 |
| 2,261,717 | Connor | Nov. 4, 1941 |
| 2,304,854 | Shields | Dec. 15, 1942 |
| 2,338,133 | Sandell | Jan. 4, 1944 |

FOREIGN PATENTS

| Number | Country | Date |
|---|---|---|
| 61,341 | Sweden | 1923 |
| 851,634 | France | 1939 |
| 49,600 | France | 1939 |
| | (Addition to No. 836,751) | |